US008356250B2

(12) United States Patent
Ko (10) Patent No.: US 8,356,250 B2
(45) Date of Patent: Jan. 15, 2013

(54) MOBILE TERMINAL AND EQUALIZER CONTROLLING METHOD THEREOF

(75) Inventor: Dong-Seuck Ko, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 584 days.

(21) Appl. No.: 12/340,204

(22) Filed: Dec. 19, 2008

(65) Prior Publication Data

US 2009/0164905 A1 Jun. 25, 2009

(30) Foreign Application Priority Data

Dec. 21, 2007 (KR) ........................ 10-2007-0135704

(51) Int. Cl.
*G06F 3/16* (2006.01)
(52) U.S. Cl. ........ 715/727; 715/702; 715/716; 715/863; 381/94.1; 381/98; 381/104; 381/124
(58) Field of Classification Search .................. 715/727, 715/863, 702, 716; 381/94.1, 98, 104, 124
See application file for complete search history.

(56) References Cited

U.S. PATENT DOCUMENTS

| 5,657,221 | A  | * | 8/1997  | Warman et al. ................. 700/83 |
| 6,373,472 | B1 | * | 4/2002  | Palalau et al. ................. 345/173 |
| 6,381,469 | B1 |   | 4/2002  | Wojick |
| 6,704,032 | B1 | * | 3/2004  | Falcon et al. ................. 715/746 |
| 6,740,802 | B1 | * | 5/2004  | Browne, Jr. ..................... 84/609 |
| 7,176,510 | B2 | * | 2/2007  | Taki et al. ..................... 257/295 |
| 7,742,609 | B2 | * | 6/2010  | Yeakel et al. ................. 381/119 |
| 2002/0054176 | A1 | * | 5/2002  | Ulrich et al. ................... 345/864 |
| 2003/0035555 | A1 |   | 2/2003  | King et al. |
| 2004/0131206 | A1 |   | 7/2004  | Cao et al. |
| 2004/0146170 | A1 | * | 7/2004  | Zint .............................. 381/103 |
| 2006/0022956 | A1 | * | 2/2006  | Lengeling et al. ............. 345/173 |
| 2006/0232586 | A1 | * | 10/2006 | Terada ........................... 345/440 |
| 2006/0291670 | A1 | * | 12/2006 | King et al. ..................... 381/103 |
| 2007/0025557 | A1 | * | 2/2007  | Nackvi et al. ..................... 381/59 |
| 2007/0061729 | A1 | * | 3/2007  | Terada ........................... 715/727 |
| 2007/0100482 | A1 | * | 5/2007  | Cotey et al. ...................... 700/94 |
| 2007/0101292 | A1 | * | 5/2007  | Kupka ........................... 715/810 |
| 2007/0146314 | A1 | * | 6/2007  | O'Sullivan ..................... 345/156 |
| 2007/0229474 | A1 | * | 10/2007 | Okabayashi ................... 345/173 |
| 2008/0002844 | A1 | * | 1/2008  | Chin .............................. 381/310 |
| 2008/0005688 | A1 | * | 1/2008  | Najdenovski ................. 715/765 |
| 2008/0036743 | A1 | * | 2/2008  | Westerman et al. .......... 345/173 |
| 2009/0047993 | A1 | * | 2/2009  | Vasa .......................... 455/556.1 |

FOREIGN PATENT DOCUMENTS

| GB | 2 357 409 A    |   | 6/2001 |
| JP | 2004-007245 A  |   | 1/2004 |
| JP | 2004007245 A   | * | 1/2004 |
| WO | WO 02/41609 A1 |   | 5/2002 |

* cited by examiner

*Primary Examiner* — Patrick Riegler
(74) *Attorney, Agent, or Firm* — Birch, Stewart, Kolasch & Birch, LLP

(57) ABSTRACT

A mobile terminal including an output unit configured to output sound, an equalizer configured to adjust parameters of the sound output by the output unit, a display unit including a touch screen and configured to display a Graphic User Interface (GUI) including a graphical guide that can be touched and moved to adjust the parameters of the sound output by the output unit, and a controller configured to control the equalizer to adjust the parameters of the sound output by the output unit in accordance with a shape of the graphical guide that is touched and moved.

20 Claims, 7 Drawing Sheets

MOBILE TERMINAL AND EQUALIZER CONTROLLING METHOD THEREOF

CROSS-REFERENCE TO A RELATED APPLICATION

The present application claims priority to Korean Application No. 10-2007-0135704, filed in Korea on Dec. 21, 2007, which is herein expressly incorporated by reference in its entirety.

BACKGROUND OF THE INVENTION

1. Field of the Invention

The present invention relates to a mobile terminal having a digital equalizer and a corresponding method for controlling the mobile terminal.

2. Description of the Background Art

A mobile terminal may be configured to perform various functions. Examples of such functions include data and voice communications, capturing images and video via a camera, recording audio, playing music files via a speaker system, and displaying images and video on a display. Some mobile terminals include an additional functionality which supports game playing, while other mobile terminals are configured as multimedia players. Moreover, mobile terminals may also be configured to watch videos or a television programs by receiving a broadcast or multicast signal.

Efforts are ongoing to support and increase the functionality of mobile terminals. Such efforts include software and hardware improvements, as well as changes and improvements in the structural components which form the mobile terminal.

In addition, users now often use their mobile terminal as a music player to listen to music. However, because the mobile terminal is small in size, the sound quality of the music player is limited. It is also often difficult and cumbersome for the user to adjust different characteristics of the sound quality.

SUMMARY OF THE INVENTION

Therefore, one object of the present invention is to address the above-noted and other drawbacks of the related art.

Another object of the present invention to provide a mobile terminal and corresponding method for conveniently and minutely adjusting output characteristics of an equalizer.

To achieve these and other advantages and in accordance with the purpose of the present invention, as embodied and broadly described herein, the present invention provides in one aspect a mobile terminal including a graphic User Interface (UI) providing a guide for adjusting an output of a sound source, a touch screen for displaying the graphic UI, and a controller for controlling output characteristics of an equalizer by adjusting a shape of the guide according to a touch input by a user.

In another aspect, the present invention provides a method for controlling an equalizer of a mobile terminal, and which includes entering a sound source play mode, displaying a graphic User Interface (UI) in the sound source play mode, and controlling output characteristics of an equalizer by adjusting a shape of a guide displayed on the graphic UI according to a touch input by a user.

In yet another aspect, the present invention provides a mobile terminal including an output unit configured to output sound, an equalizer configured to adjust parameters of the sound output by the output unit, a display unit including a touch screen and configured to display a Graphic User Interface (GUI) including a graphical guide that can be touched and moved to adjust the parameters of the sound output by the output unit, and a controller configured to control the equalizer to adjust the parameters of the sound output by the output unit in accordance with a shape of the graphical guide that is touched and moved.

In still another aspect, the present invention provides a method of controlling a mobile terminal, and which includes outputting sound via an output unit in the mobile terminal, displaying a Graphic User Interface (GUI) including a graphical guide that can be touched and moved to adjust parameters of the sound output by the output unit, and adjusting the parameters of the sound output by the output unit in accordance with a shape of the graphical guide that is touched and moved.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
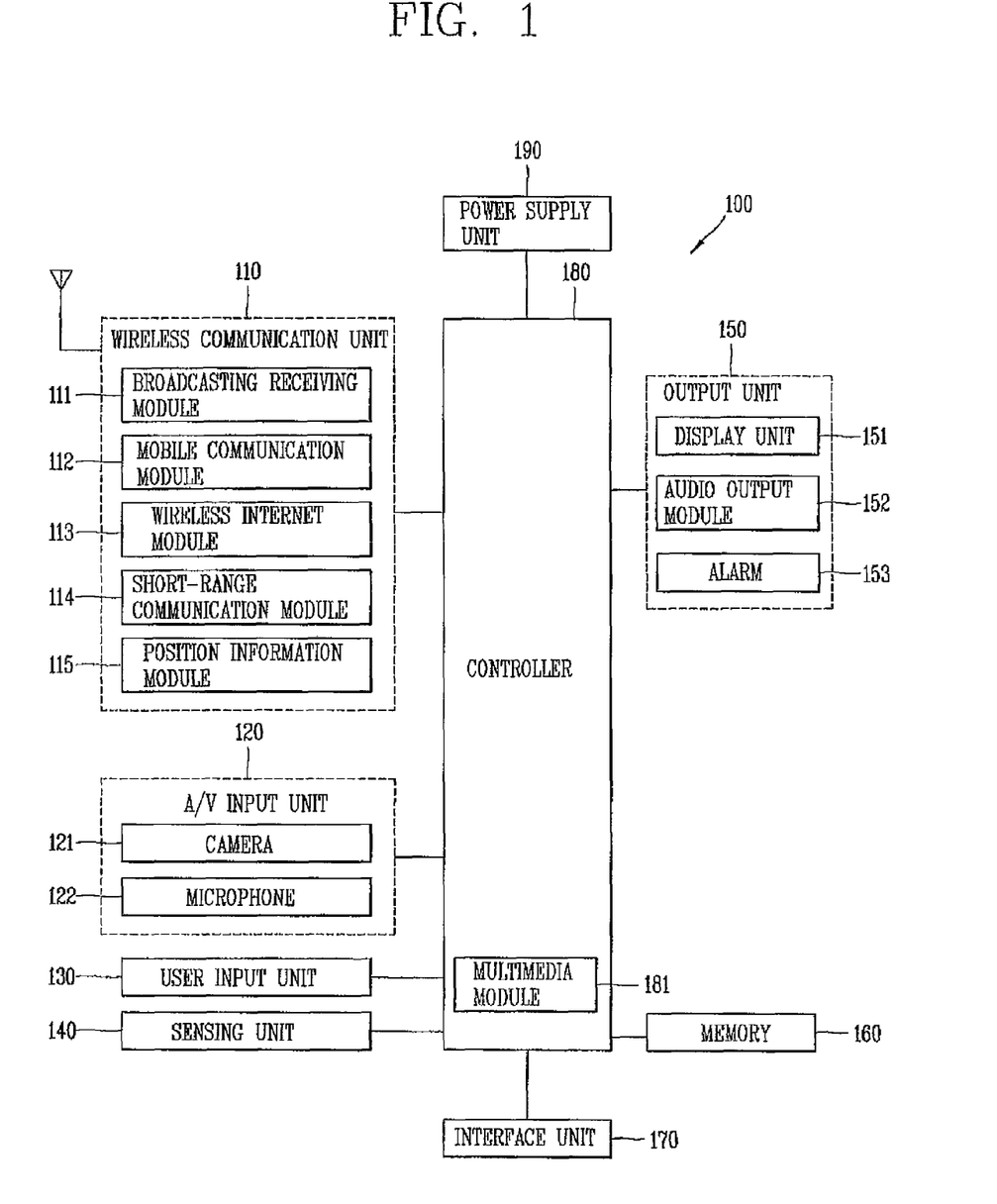
FIG. 1 is a block diagram illustrating a mobile terminal according to one embodiment of the present invention.

FIG. 1 is a block diagram illustrating a mobile terminal according to one embodiment of the present invention. In addition, a mobile terminal may be implemented using a variety of different types of terminals. Examples of such terminals include mobile phones, smart phones, notebook computers, digital broadcast terminals, Personal Digital Assistants (PDA), Portable Multimedia Players (PMP), navigators and the like.

As shown in FIG. 1, the mobile terminal 100 may include components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

In addition, the wireless communication unit 110 may include one or more components which permit wireless communication between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114 and a position information module 115.

Further, the broadcast receiving module 111 receives a broadcast signal and/or broadcast associated information from an external broadcast managing server via a broadcast channel. The broadcast channel may include a satellite channel and a terrestrial channel, and the broadcast managing server may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like. The broadcast signal may be implemented as a TV broadcast signal, a radio broadcast signal, and a data broadcast signal, among others. The broadcast signal may further include a data broadcast signal combined with a TV or radio broadcast signal.

In addition, the broadcast associated information may be provided via a mobile communication network, and received by the mobile communication module 112. The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

Also, the broadcast receiving module 111 may be configured to receive digital broadcast signals transmitted from various types of broadcast systems. Such broadcast systems may include the Digital Multimedia Broadcasting-Terrestrial (DMB-T) system, the Digital Multimedia Broadcasting-Satellite (DMB-S) system, the Media Forward Link Only (MediaFLO) system, the Digital Video Broadcast-Handheld (DVB-H) system, the Integrated Services Digital Broadcast-Terrestrial (ISDB-T) system, and the like. Further, the broadcast receiving module 111 may be configured to be suitable for all broadcast system transmitting broadcast signals as well as the digital broadcasting systems. Broadcast signals and/or broadcast associated information received via the broadcast receiving module 111 may also be stored in a memory 160.

In addition, the mobile communication module 112 transmits/receives wireless signals to/from at least one of network entities (e.g., base station, an external mobile terminal, a server, etc.) on a mobile communication network. Further, the wireless signals may include audio call signal, video call signal, or various formats of data according to transmission/reception of text/multimedia messages.

The wireless Internet module 113 supports wireless Internet access for the mobile terminal, and may be internally or externally coupled to the mobile terminal. In addition, the short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

Further, the position information module 115 denotes a module for detecting or calculating a position of a mobile terminal. An example of the position information module 115 may include a Global Positioning System (GPS) module. The GPS module may receive position information in cooperation with associated multiple satellites. Also, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can also obtain three-dimensional speed information and an accurate time, as well as a position on latitude, longitude and altitude, from the position information received from the satellites.

Further, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151. Also, the image frames processed by the camera 121 may be stored in the memory 160 or transmitted to the exterior via the wireless communication unit 110. Two or more cameras 121 may also be provided according to the configuration of the mobile terminal.

In addition, the microphone 122 may receive an external audio signal while the mobile terminal is in a particular mode, such as a phone call mode, a recording mode, a voice recognition mode, or the like. This audio signal is then processed into electric voice data, and the processed voice data is converted for output into a format transmittable to a mobile communication base station via the mobile communication module 112 for the phone call mode. The microphone 122 may also include assorted noise removing algorithms to remove noise generated in the course of receiving the external audio signal.

Further, the user input unit 130 may generate input data input by a user to control the operation of the mobile terminal. The user input unit 130 may include a keypad, a dome switch, a touch pad (e.g., static pressure/capacitance), a jog wheel, a jog switch and the like. A specific example can be one in which the touch pad is layered with the display unit 151 so as to be in cooperation with the display unit 151, which is referred to as a touch screen.

The sensing unit 140 also provides status measurements of various aspects of the mobile terminal. For instance, the sensing unit 140 may detect an open/close status of the mobile terminal 100, a location of the mobile terminal 100, a presence or absence of user contact with the mobile terminal 100, a direction of the mobile terminal, acceleration/deceleration of the mobile terminal, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device, etc.

In addition, the interface unit 170 is generally implemented to couple the mobile terminal 100 to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port. Such interface unit 170 may receive data from an external device, or provided with power and accordingly transfer the received data or power to each component within the mobile terminal 100 or transfer data of the mobile terminal 100 to an external device.

Further, the output unit 150 is configured to output an audio signal, a video signal or an alarm signal, and may include a display unit 151, an audio output module 152, an alarm 153, and the like. The display unit 151 may output information processed in the mobile terminal 100. For example, when the mobile terminal is operated in a phone call mode, the display unit 151 will provide a User Interface (UI) or a Graphic User Interface (GUI), which includes information associated with the call. As another example, if the mobile terminal 100 is in a video call mode or a capturing mode, the display unit 151 may additionally or alternatively display images captured and/or received, UI, or GUI.

Meanwhile, as mentioned above, a touch screen can be configured as the display unit 151 and the touch pad are layered to work in cooperation with each other. This configuration permits the display unit 151 to function both as an input device and an output device. Further, the display unit 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. The mobile terminal 100 may also include two or more of such displays unit 151. For example, the mobile terminal 100 may simultaneously include an external display and an internal display.

In addition, the audio output module 152 may output audio data received from the wireless communication unit 110 in various modes including a call-receiving mode, a call-placing mode, a recording mode, a voice recognition mode, a broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

Further, the alarm 153 may output a signal to inform a generation of event associated with the mobile terminal 100. Typical events may include call received, message received, user input received and the like. In addition to generating the audio or video signal, the alarm 153 may also inform the event generation in different manners, for example, by providing tactile sensations (e.g., a vibration) to a user. The alarm 153 may also be configured to vibrate responsive to the mobile terminal receiving a call or message. As another example, a vibration is provided by the alarm 153 responsive to receiving user input at the mobile terminal, thus providing a tactile feedback mechanism. Such vibration can also be provided to make a user recognize the event generation. Also, the signal informing the event generation may be output via the display unit 151 or the audio output module 152.

In addition, the memory 160 may store a program for the processing and controlling the controller 180. The memory 160 may also temporarily store input/output data (e.g., phonebook data, messages, still images, video and the like). Further, the memory 160 may be implemented using any type of suitable storage medium including a flash memory type, a hard disk type, a multimedia card micro type, a memory card type (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage, which performs the storage function of the memory 160 on the Internet.

Further, the controller 180 generally controls the overall operations of the mobile terminal. For example, the controller 180 performs the control and processing associated with voice calls, data communications, video calls, and the like. The controller 180 may also include a multimedia module 181, which provides multimedia playback. The multimedia module 181 may be configured as part of the controller 180 or as a separate component. In addition, the power supply unit 190 provides power used by various components under the control of the controller 180. The provided power may be internal power, external power, or combination thereof.

In addition, the internal components of the mobile terminal related to an embodiment of the present invention have been described above from the perspective of their functions. Hereinafter, external components of the mobile terminal according to an embodiment of the present invention will be described from the perspective of their functions with reference to FIGS. 2 and 3.

Further, the mobile terminal may be implemented in a variety of different configurations. Examples of such configurations include folder-type, bar-type, swing-type, slide-type or the like. The following embodiment refers to a slide-type mobile terminal. However, the present invention is not limited to the slide-type mobile terminal, and can be applied to other types of terminals including the above-mentioned types of terminals.

Figure 2:
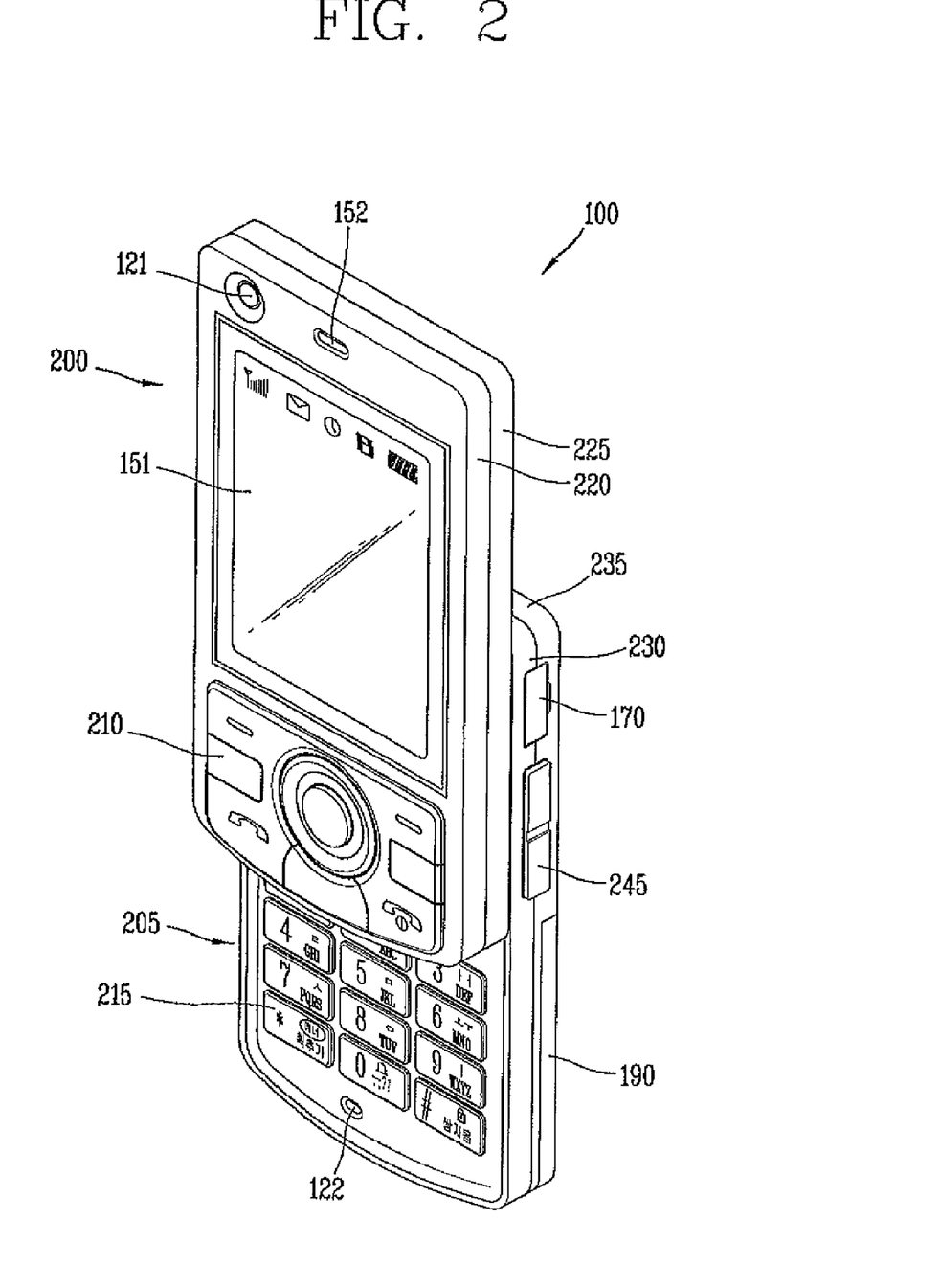
FIG. 2 is a front perspective view of a mobile terminal according to one embodiment of the present invention.

FIG. 2 is a front perspective view of a mobile terminal according to one embodiment of the present invention. As shown, the mobile terminal may include a first body 200, and a second body 205 configured to slidably cooperate with the first body 200 in at least one direction. For a folder-type mobile terminal, the mobile terminal may include a first body, and a second body configured to have at least one side folded or unfolded with respect to the first body.

Further, the first body 200 is positioned over the second body 205 in a manner that the second body 205 is obscured by the first body 200. This state can be referred to as a closed configuration (position). As illustrated in FIG. 2, the state where the first body 200 exposes at least part of the second body 205 can be referred to as an open configuration (position). The mobile terminal may also be operable in a standby mode when in the closed configuration, but this mode can be released by the user's manipulation. Also, the mobile terminal may be operable in an active (phone call) mode in the open configuration. Further, this mode may be changed into the standby mode according to the user's manipulation or after a certain time elapses.

In addition, a case (housing, casing, cover, etc.) forming the outside of the first body 200 is formed by a first front case 220 and a first rear case 225. Various electronic components may be disposed in a space between the first front case 220 and the first rear case 225. Also, one or more intermediate cases may additionally be disposed between the first front case 220 and the first rear case 225. The cases can also be formed of synthetic resin by injection molding, or formed using metallic materials such as stainless steel (STS) and titanium (Ti).

In addition, the display unit 151, a first audio output module 152, the camera 121 or a first user input unit 210 may be disposed at the first front case 220 of the first body 200. Further, as discussed above, the display unit 151 may include an LCD, OLED, and the like, which can visibly display information. Also, the display unit 151 and a touch pad can be layered with each other such that the display unit 151 can be configured to function as a touch screen so as to allow a user to input information in a touching manner.

In addition, the first audio output module 152 may be implemented as a speaker, and the camera 121 may be implemented to be suitable for a user to capture still images or moving images. Also, like the first body 200, a case configuring the outside of the second body 205 may be formed by a second front case 230 and a second rear case 235.

A second user input unit 215 may also be disposed at the second body 205, and in particular, at a front surface of the second front case 230. A third user input unit 245, a microphone 122 and an interface unit 170 may also be disposed at either the second front case 230 or the second rear case 235. Further, the first to third user input units 210, 215 and 245 may be called user input units (manipulation portions) 130. The user input unit 130 can be implemented as any input units for inputting information by a user in a tactile manner. For example, the user input unit 130 can be implemented as a dome switch or touch pad which a user can input information in a pushing or touching manner, or implemented in a manner of using a wheel, a jog or a joystick to rotate keys.

In addition, regarding each function, the first user input unit 210 is used for inputting commands such as START, END, SCROLL or the like, and the second user input unit 215 is used for inputting numbers, characters, symbols, or the like. Also, the third user input unit 245 can be operated as a hot key for activating a specific function within the mobile terminal.

In addition, the microphone 122 may be implemented to be suitable for receiving user's voice or various sounds. The interface unit 170 may be used as a passage through which the terminal related to the present invention can exchange data or the like with an external device. For example, the interface unit 170 may be implemented as one of a wired/wireless connection port for connecting an earphone to the mobile terminal, a port for short-range communications (e.g., an Infrared Data Association (IrDA) port, a Bluetooth port, a wireless LAN port, etc.), power supply ports for providing power to the mobile terminal, or the like.

The interface unit 170 can be a card socket for receiving an external card, such as a Subscriber Identity Module (SIM), a User Identity Module (UIM), a memory card for storing information, or the like. In addition, the power supply unit 190 may be disposed at a side of the second rear case 235 to provide power to the mobile terminal. Also, the power supply unit 190 may be a rechargeable battery, for example, to be attachable/detachable for charging.

Figure 3:
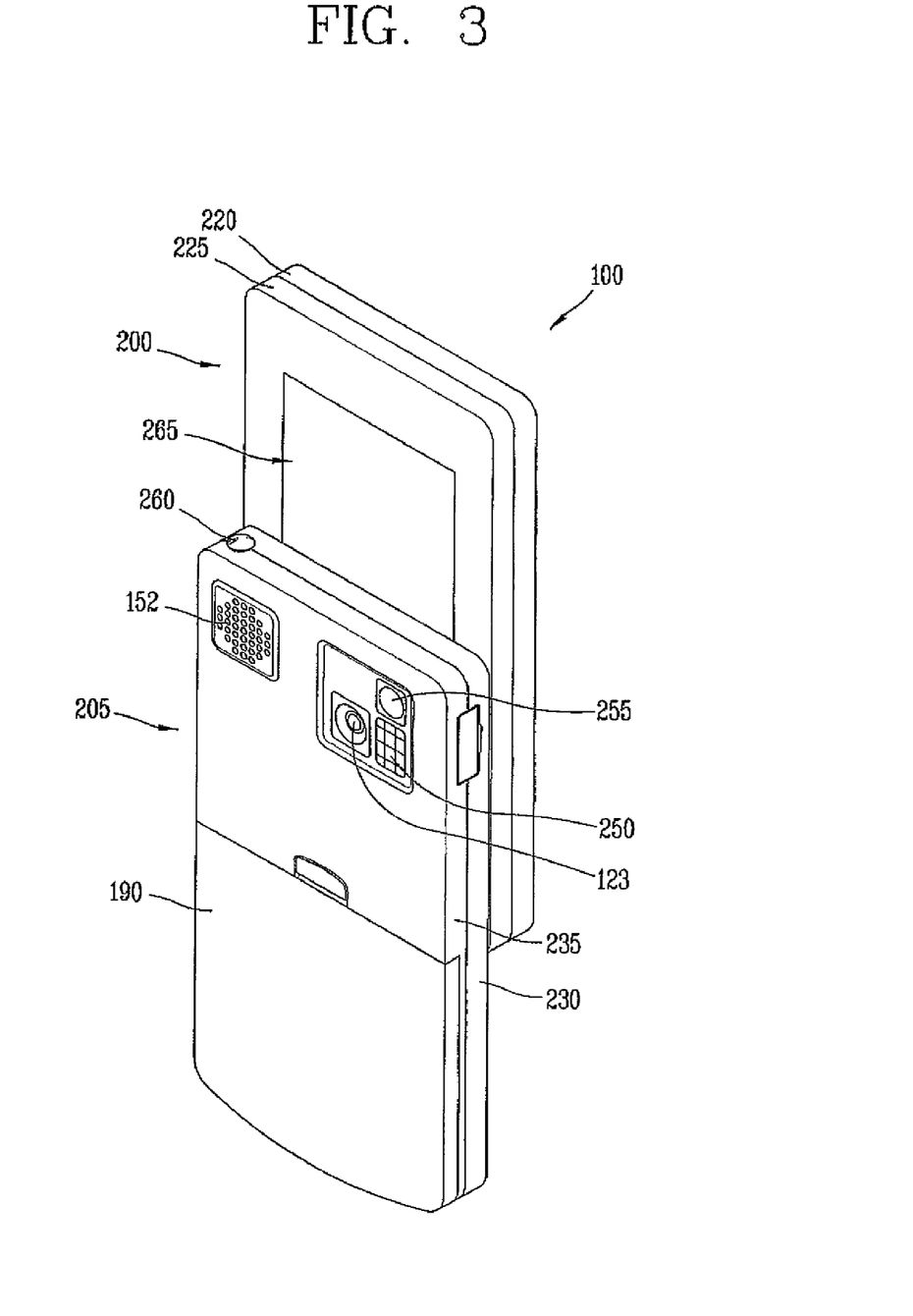
FIG. 3 is a rear perspective view of a mobile terminal according to one embodiment of the present invention.

Next, FIG. 3 is a rear perspective view showing the mobile terminal of FIG. 2. As illustrated in FIG. 3, another camera 121 may be disposed at a rear face of the second rear case 235 of the second body 205. Further, the camera 121 of the second body 205 faces a direction that is opposite to a direction faced by the camera 121 of the first body 200, and may have different pixels from those of the camera 121 of the first camera 200.

For example, the camera 121 of the first body 200 may operate with relatively lower pixels (lower resolution). Thus, the camera 121 of the first body 200 may be useful when a user captures his or her own image and sends the captured image to another party during a video call or the like. On the other hand, the camera 121 of the second body may operate with a relatively higher pixels (higher resolution) such that it can be useful for a user to obtain higher quality pictures for later use.

In addition, a flash 250 and a mirror 255 may additionally be disposed adjacent to the camera 121 of the second body 205. The flash 250 provides light to a subject to be captured when taking a picture using the camera 121 of the second body 205, and the mirror 255 can cooperate with the camera 121 of the second body 205 to allow a user to photograph himself in a self-portrait mode. Further, the second rear case 235 may further include another audio output module 152. The audio output module 152 of the second body 205 can cooperate with the audio output module 152 of the first body 200 to provide stereo output. Also, the audio output module 152 of the second body 205 may be configured to operate as a speakerphone.

Further, a broadcast signal receiving antenna 260 may be disposed at one side of the second rear case 235, in addition to an antenna for communications. The antenna 260 can be configured to retract into the second body 205. Also, one part of a slide module 265, which allows the first body 200 to be slidably coupled to the second body 205, may be disposed at the first rear case 225 of the first body 200. Also, the other part of the slide module 265 may be disposed at the second front case 230 of the second body 205, such that it may not be exposed to the exterior as illustrated in the drawing.

In addition, the above description describes that the second camera 121 is disposed at the second body 205, however, the present invention is not limited to this configuration. For example, it is also possible that one or more of those components (e.g., 260, 121 to 250, 152), which have been described to be implemented on the second rear case 235, such as the camera 121 of the second body, will be implemented on the first body 200, and particularly, on the first rear case 225. In this configuration, the component(s) disposed on the first rear case 225 can be protected by the second body 205 in a closed position of the mobile terminal. In addition, without the camera 121 of the second body, the camera 121 of the first body can be implemented to be rotatable so as to rotate up to a direction which the camera 121 of the second body faces.

In addition, the terminal 100 illustrated in FIGS. 1 to 3, may be configured to be operable in a communication system that can transmit data through a frame or packet including a wired/wireless communication system and a satellite-based communication system. Hereafter, referring to FIG. 4, the communication system in which the terminal related to an embodiment of the present invention is operable will be explained.

The communication system may utilize wireless interfaces and/or physical layers different from each other. For example, the wireless interface which can be used by the communication system may includes Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), and the like. The present embodiment is related to CDMA, however, the present invention can be applied to all other types of communication systems.

Figure 4:
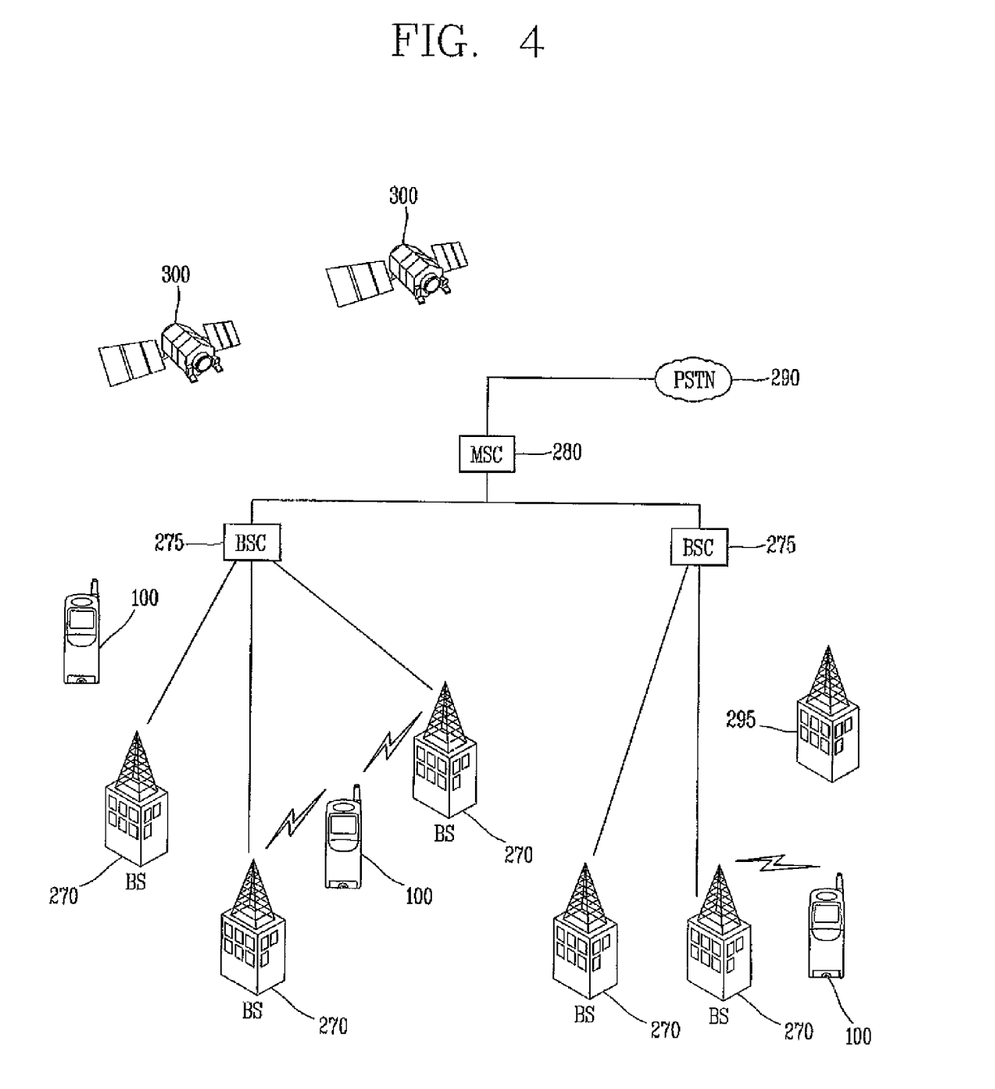
FIG. 4 is a block diagram showing a wireless communication system for operating a mobile terminal according to one embodiment of the present invention.

As shown in FIG. 4, the CDMA wireless communication system may include a plurality of terminals 100, a plurality of Base Stations (BS) 270, a plurality of Base Station Controllers (BSC) 275, and a Mobile Switching Center (MSC) 280. The MSC 280 is configured to be connected to a Public Switched Telephone Network (PSTN) 290 and to the BSCs 275. Further, the BSCs 275 may be connected to the BSs 270 while being paired therewith through a backhaul line. The backhaul line may be provided by at least one of E1/T1, ATM, IP, PPP, Frame Relay, HDSL, ADSL or xDSL. Accordingly, the plurality of BSCs 275 may be included in the system shown in FIG. 4.

In addition, each BS 270 may include at least one sector, and each sector may include an omnidirectional antenna or an antenna directing a specific radial direction from the corresponding BS 270. Alternatively, each sector may include two or more antenna having various shapes. Each BS 270 may also be configured to support allocation of a plurality of frequencies in which each frequency allocation is provided with a specific spectrum (e.g., 1.25 MHz, 5 MHz, etc.).

Further, intersection between the sector and the frequency allocation may be referred to as a CDMA channel. The BSs 270 may also be referred to as Base Station Transceiver Subsystems (BTSs). Also, the term "Base Station" may refer to a combination of one BSC 275 and at least one BS 270. The Base Station may also refer to a "cell site". Alternately, each of the sectors with respect to a specific BS 270 may be referred to as a plurality of cell sites.

As illustrated in FIG. 4, a Broadcasting Transmitter (BT) 295 serves to transmit a broadcast signal to the terminals 100 operating in the system. The broadcast receiving module 111 shown in FIG. 1 is provided in the terminal 100 so as to receive the broadcast signal transmitted by the BT 295. Further, FIG. 4 illustrates multiple Global Positioning System (GPS) satellites 300. The satellites 300 serve to detect a position of at least one of the multiple terminals 100. Two satellites are illustrated in FIG. 4, however, useful position information may be obtained by more or less than two satellites.

The GPS module 115 illustrated in FIG. 1 is in cooperation with the satellites 300 so as to obtain desiring position information. Further, the module 115 can be configured to track the position using all techniques allowing to track positions, as well as the GPS tracking technique. Also, at least one of the GPS satellites 300 may handle satellite DMB transmission alternatively or additionally.

In addition BS 270 serves to receive reverse link signals from various terminals 100. Also, the terminal 100 is connecting a call, transceiving a message or executing other communication operations. Each reverse link signal received by a specific BS 270 is processed within the specific BS 270, and data generated resulting from the processing is transmitted to the respectively connected BSCs 275. Further, the BSCs 275 serve to allocate a call resource and manage mobility, including systemization of soft handoffs between the BSs 270. Also, the BSCs 275 transmit the received data to the MSC 280, and then the MSC 280 provides an additional transmission service so as to be connected to a PSTN 290. Similarly, the PSTN 290 is connected to the MSC 280 and the MSC 280 is connected to the BSCs 275. Then, the BSCs 275 control the BSs 270 so as to transmit forward link signals to the terminals 100.

Further, as illustrated in FIG. 1, the display unit 151 may display a User Interface (UI) or a Graphic User interface (GUI) relating to a call when the mobile terminal 100 is in a call mode. On the other hand, if the mobile terminal 100 is in a video call mode or a capturing mode, the display unit 151 may display images captured and/or received, UI, or GUI.

Also, when the mobile terminal 100 is in a sound source play mode, the display unit 151 may display a GUI for adjusting an output of a sound source and an additional selective menu window for adjusting parameters (i.e., frequency, gain, Q-factor, etc.) which are desired by a user. The selective menu window includes a frequency, a gain, Q-factor, and an item for setting a touch or drag sound effect.

Further, the audio output module 152 may output audio data which is received from the wireless communication unit 110 or is stored in the memory 160. Also, the audio output module 152 may output an audio signal relating to a particular function (e.g., a call received, a message received, etc.) performed in the mobile terminal 100 and relating to an adjustment of the sound source output by an equalizer. As an example, the sound output module 152 may be configured to generate a specific sound signal when a user adjusts a sound to be output in a level exceeding a permitted level or to output distinctive sound signals whenever each parameter (i.e., frequency, gain and Q-factor) is adjusted.

Further, the memory 160 may store a program to be processed and controlled by the controller 180 and a GUI for adjusting a sound source output, and may temporarily store a pattern of the sound source output adjusted by the user through the GUI, that is, a guide. The controller 180 also controls the overall operation of the mobile terminal. For instance, the controller 180 performs controls and processes such as a voice call, a data communication, and a video call. The controller 180 also performs controls and processes for adjusting a sound source output characteristics of the equalizer.

Hereinafter, a GUI controlling method of an audio device in a mobile terminal according to an embodiment of the present invention will be explained in more detail with reference to the drawings.

An equalizer (EQ) is a device for selectively increasing or decreasing a volume level of a specific frequency, that is, an audio-frequency band (20 Hz~20 Khz) in an audio device. The equalizer is also categorized into a graphic equalizer and a digital parametric equalizer according to the use of the device. Further, the graphic equalizer is configured to have frequencies across various bands visually arranged from left to right so as to increase or decrease the frequency by moving a volume slider in a vertical direction. The digital parametric equalizer is applied to a full digital amplifier and controls an input digital sound source according to parameters using each filter.

An embodiment of the present invention provides parameters (i.e., frequency, gain and Q-factor) for directly adjusting the equalizer (EQ) output characteristics in the mobile terminal through a GUI, by applying a digital parametric EQ to the equalizer of the mobile terminal. The digital parametric EQ also displays a shape of a filter in a curved line, and the digital parametric EQ tunes up a needed frequency band by adjusting a bandwidth (Q-factor) of the filter as well as a frequency and a filter gain.

Further, in an embodiment of the present invention, the terminal user controls the parameters of the digital parametric EQ in a touch input manner (touch, drag & drop and flicking), and accordingly the EQ can be tuned more minutely. Also, the values of the parameters set by the user are stored and utilized for playing music. Thus, because the parameters of the digital parametric EQ are adjusted in the touch manner at a moment that a sound source is output, the user can adjust the output of sound source while visually and auditorily checking the input changes of the sound source.

The touch input methods according to embodiments of the present invention include a rear-touch or a contact touch. Further, in one embodiment, the user actually touches the screen or display using a pointer (e.g., a finger, pen, stylus, etc.). In another embodiment, a proximity-touch method can be used. In more detail, the proximity-touch method corresponds to the user moving their finger or pen, stylus, etc. toward an item on the screen, but not actually touching or making contact with the screen. That is, the pointer approaches the screen, but remains a certain gap from the screen. The different types of touches will now be described in more detail.

Types of Touches short touch: selecting and generating points (filters), and requesting a menu (setting in an initial menu)

long touch: generating a selective menu window for adjusting parameters of a touch point (e.g., able to directly input a frequency, a gain and a Q-factor, setting a touch or drag sound effect)

double touch: eliminating a generated point multi-point touch: adjusting a Q-factor flicking: returning to an initial position Functions of Touches generating and eliminating points representing each filter adjusting a gain and a frequency of a digital parametric EQ (dragging & dropping after touching)

adjusting a Q-factor of a digital parametric EQ (dragging & dropping after touching multi points)

displaying a menu (inputting parameters or setting a sound effect at a time of a long touch)

other functions (displaying an adjusted parameter value at a specific area at a time of touching a blank space)

Figure 5:
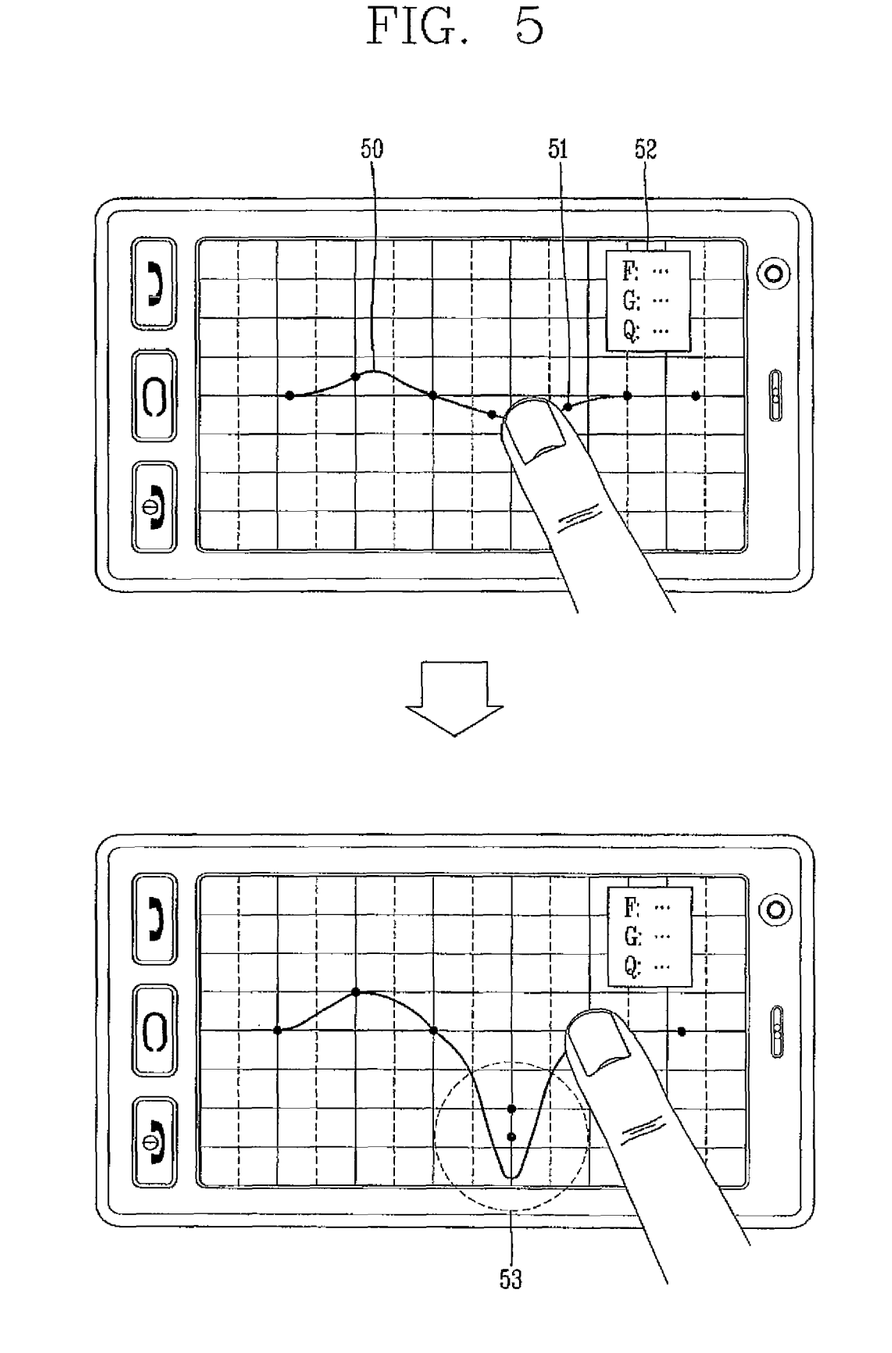
FIG. 5 is an overview showing a Graphic User Interface (GUI) in a mobile terminal according to an embodiment of the present invention.

Next, FIG. 5 is an overview showing a GUI implemented in a touch manner in a mobile terminal according to one embodiment of the present invention. As shown in FIG. 5, a user schematically inputs output characteristics of an audio device of a terminal, that is, a digital parametric EQ, and then minutely adjusts the same. That is, unlike an EQ for each band in the audio player, an embodiment of the present invention allows the user to set a shape of the EQ in a curved line and then move at least one point representing a specific filter on the corresponding curved line so as to adjust a Q-factor as well as a frequency and a gain of the output sound.

In more detail when the user selects a sound source play mode in a menu of the mobile terminal, the controller 180 displays a GUI of the digital parametric EQ on a touch screen while the sound source is output. Then, as shown in FIG. 5, when the user draws a curved line 50 (serving as a guide) for adjusting an output of the sound source on the touch screen in a touch & drag manner on the GUI, at least one point 51 is displayed on the curved line 50.

In addition, each point 51 indicates a corresponding EQ filter. The number of the points may be initially set in a menu, or may be newly added or deleted by a touch manner when setting the EQ output characteristics. In the present embodiment, seven points are displayed, and thus a 7-band full parametric EQ is implemented. Further, in one example, the X-axis denotes a frequency, the Y-axis denotes a gain, and a sharpness of the curved line denotes a Q-factor.

Also, the line 50 is implemented as a curved line constituted with points located at different positions, which shows changes of the EQ filters with respect to changes of output frequency characteristics. In addition, each point 51 is selected using a short touch manner in one embodiment of the present invention. The positions of the points can also be changed in a drag & drop manner. Further, when a specific point 51 is selected, a specific sound is generated or a color is changed so as to distinguish the selected point from other non-selected points.

To implement such settings, the controller 180 can display an additional menu window when the user touches the corresponding point using a long touch manner. Further, the user may directly input values for the parameters, that is, a frequency, a gain and a Q-factor, of the corresponding point in the menu window generated by the long touch manner, and may set or change a touch or drag sound effect and a color of light.

If the user does not use the selective menu window, the user may adjust the frequency and gain characteristics in the drag & drop manner after touching each point 51. In other words, the gain value may be adjusted by dragging the point in a vertical direction and/or the frequency may be adjusted by dragging the corresponding point in a horizontal direction after touching a desired point on the curved line 50 displayed on the touch screen. Also, in this state, if a flicking manner is executed by the user, the point having the adjusted gain and/or frequency returns to the original position 50.

In addition, the user may generate new points by touching a specific position (blank space) on the curved line 50. Also, the number of the generated points depends on the number of bands of the digital parametric EQ. Additional points will be eliminated when they are touched again (double-touch). Further, the user may adjust the Q-factor in the GUI of the digital parametric EQ by using a multi-touch method (multi-point touch). Also, the user may adjust the sharpness of the curved line 50, that is, the Q-factor, by decreasing or increasing a gap between two fingers when touching a width of the curved line 50 with two fingers.

Further, the values of the adjusted frequency, gain and Q-factor can be displayed at a specific area 52 in a right upper portion of the touch screen. The area 52 is configured to be displayed when the user touches a blank space where the curved line 50 is not disposed and is eliminated when the user touches the area 52 again, or may always be displayed by initially setting a menu. Also, in the area 52, the filter that is currently selected (touched point) and the values of the frequency/gain/Q-factor at the current position are displayed.

In addition, in the GUI of the digital parametric EQ, the user may adjust one or more parameters simultaneously. For instance, as shown by the reference numeral 53 in FIG. 5, the gain and the Q-factor may be increased by overlapping two points. In addition, when the user completes the setting of the parameters, the position values (frequency, gain and Q-factor) of each filter are stored in the memory. Therefore, the user can listen to music with the controller 180 reading the stored values as necessary.

As described above, the GUI of the audio device shown in FIG. 5 allows the user to minutely adjust the output of the sound source according to the user's desire after schematically inputting the output characteristics of the EQ.

Figure 6:
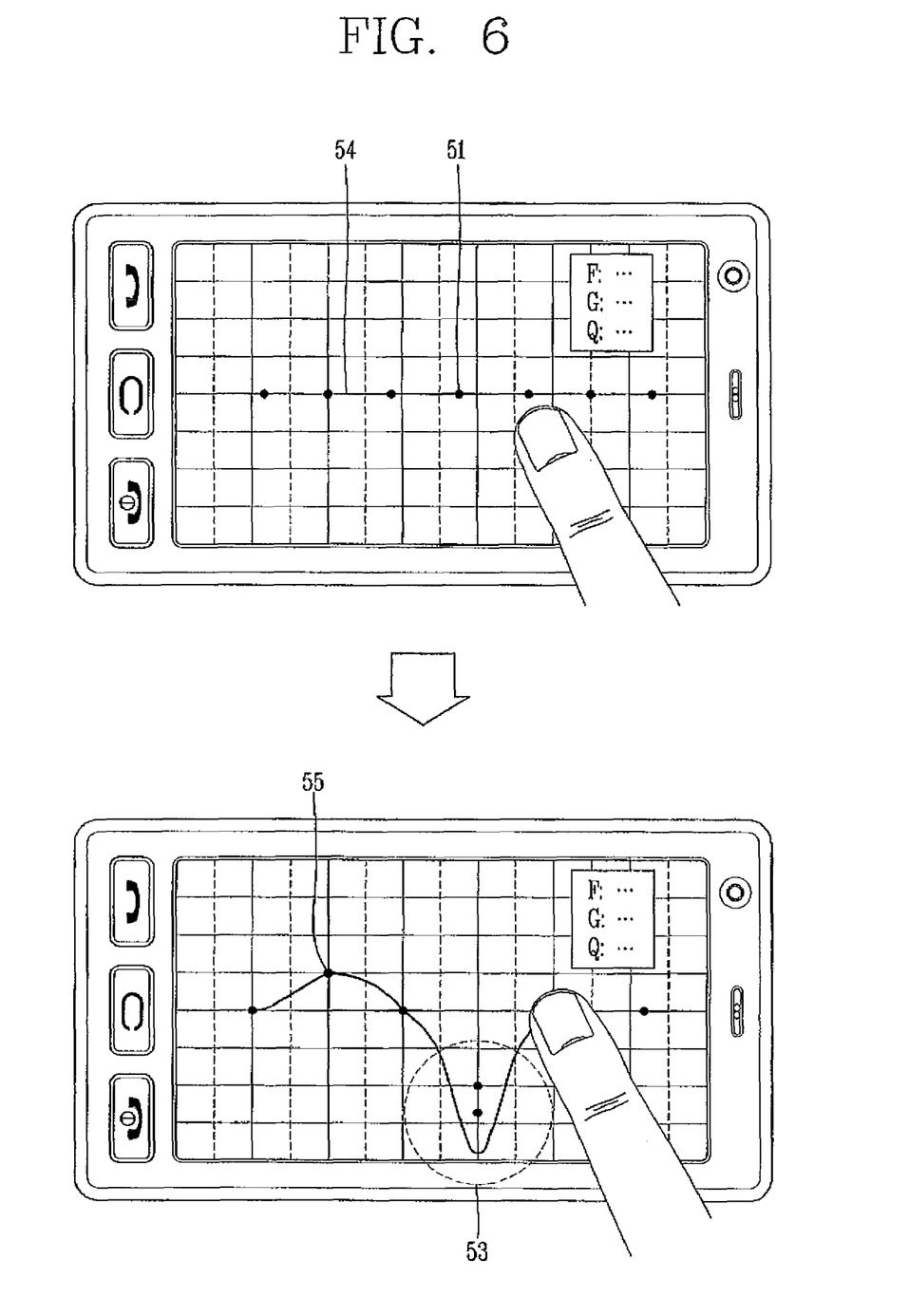
FIG. 6 is an overview showing a GUI in a mobile terminal according to another embodiment of the present invention.

Next, FIG. 6 an overview showing a GUI implemented in a touch manner in a mobile terminal according to another embodiment of the present invention. In this embodiment, a pre-stored basic guide is provided. In particular, FIG. 6 shows output characteristics of a digital parametric EQ of the terminal being provided in a reference line shape, and then the user can minutely adjust the parameters on the corresponding reference line.

That is, as shown in FIG. 6, if the user selects the sound source play mode, the sound source is output and the controller 18 displays an additional basic guide, that is, the reference line 54 and at least one point 51 on the touch screen at the same time. The reference line 54 is a pre-stored optimized EQ characteristic and implemented as a straight line as shown in FIG. 6 or as a pre-determined curved line for each music mode, that is, a curved line implemented by partially adjusting a frequency, a gain and a Q-factor.

In FIG. 6, the straight line shaped reference line 54 is used. However, a curved line shape can also be used. Also, the curved line shaped EQ characteristic is preferably one of an EQ characteristic changed and stored after the adjustment operation shown in FIG. 6 (or FIG. 5) and an EQ characteristic set (fixed) in a default format. In addition, as discussed above with respect to FIG. 5, each point 51 denotes a corresponding EQ filter and the number of the points is set in the menu at an initial time.

Further, the user can select a desired point 51 using a short-touching method on the displayed reference line 54 and move a position of the corresponding point in a drag & drop manner. The embodiment of FIG. 6 may also be configured to generate a specific sound or change a color so as to distinguish a selected specific point 51 from other points, similar to that in FIG. 5. Such setting can be implemented by displaying an additional menu window when the corresponding point is touched for a long period of time (a long touching operation). The user can also directly input parameters, that is, the frequency, the gain and the Q-factor, of the corresponding point on the selective menu window generated using the long touching operation, and can set or change the touch or drag sound effect and a color of light.

Rather than using the selective menu window, the user may also adjust the frequency and gain characteristics in the drag & drop manner after touching each point 51 on the reference line 54 and then generate an adjusted curved line 55. In other words, the user may drag a desired point in the vertical direction so as to adjust the gain value or drag the corresponding point in a horizontal direction so as to adjust the frequency, after touching the point on the reference line 54 displayed on the touch screen. In this state, if the user flicks the selected point with their finger or stylus pen, the point having the adjusted gain and/or frequency value may return to the original reference line 54.

In addition, the detailed adjustment for the parameters on the reference line 54 is the same as that on the curved line 50 in FIG. 5. That is, the user may generated new points by touching a specific position (a position where points don't exist) on the reference line 54. Further, the number of generated points depends on the number of band of the digital parametric EQ, and an added point is eliminated when the point is again touched (double-touch).

Further, in the GUI of the digital parametric EQ, the user may adjust the Q-factor using a multi-touch (multi-point touch) manner. For example, the user may adjust the sharpness of the curved line 54, that is, the Q-factor, by decreasing or increasing a gap between their two fingers when touching a width of the curved line 55 with two fingers. The values of the adjusted frequency, gain and Q-factor are also displayed at a specific area 52 in the right upper end portion of the touch screen.

Also, the area 52 is configured to be displayed when the user touches a blank space where the curved line 54 is not disposed and can be eliminated when the user again touches the area 52, or can always be displayed by setting a menu at an initial time. In the area 52, the currently selected (touched) point and the values of the frequency/gain/Q-factor at the current position are displayed.

Further, as described above with respect to FIG. 5, the user may simultaneously adjust one or more parameters. For instance, as shown by the reference numeral 53 is FIG. 6, the gain and the Q-factor may be increased by overlapping two points. Also, when the user completes the setting of the parameters, the position values (frequency, gain and Q-factor) of each filter are stored in the memory. Therefore, the user can listen to music with the controller 180 reading the stored values as necessary.

Thus, as described above with respect to the GUI shown in FIG. 6, the user can minutely adjust the output of sound source according to their desire in the drag & drop manner after an addition reference line is provided (e.g., a straight line or curved line) and then touching or and manipulating the reference line.

Figure 7:
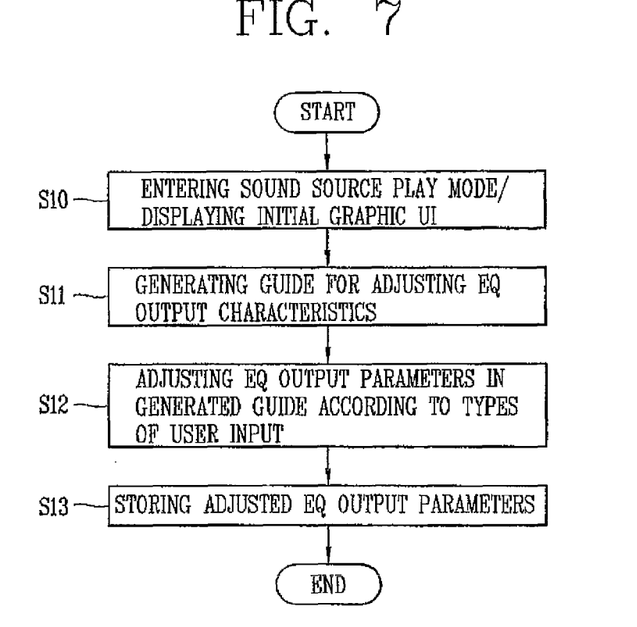
FIG. 7 is a flowchart showing a method for controlling an equalizer in a mobile terminal according to a first embodiment of the present invention.

Next, FIG. 7 is a flowchart showing a method for controlling an equalizer in a mobile terminal according to a first embodiment of the present invention. Referring to FIG. 7, the user can select the sound source play mode by touching a specific key of the user input unit 130 and then enter an EQ output characteristic controlling mode from the selected sound source play mode (S10). When the EQ output characteristic controlling mode is selected, the controller 180 displays an initial GUI on the touch screen of the display module 151.

In addition, if the user touches and drags their finger or stylus on the touch screen in the initial graphic UI, the controller 180 generates a guide for adjusting the output of the sound source on the touch screen according to a moving direction of the touch and a touching distance (S11). Further, as discussed above, the X-axis denotes a frequency and the Y-axis denotes a gain in the initial graphic UI.

In addition, the guide includes the drawn curved line 50 and at least one point 52 located on the curved line 50 as shown in FIG. 5. Also, the number of the points can be initially set in the menu, and a point can be added or deleted in a touch manner as necessary. Thereafter, the controller 180 changes the shape of the guide according to a type of the touch input and then adjusts the adjusted parameter values (frequency, gain and Q-factor) (S12).

For example, when the user uses a short touch input method, the controller 180 generates a touch sound effect or change a color of the selected point Also, when the user uses a long touch input method, the controller 180 displays a selective menu window for adjusting the parameters with respect to the corresponding point. That is, if an additional touch is input by the user such as by using the long touch input method, the selective menu window stored in the memory 160 may be displayed on the display unit 151. The controller 180 then stores the user input at the corresponding selective menu window in the memory 180 and executes a corresponding function at the same time.

Further, once the guide is generated, the user can adjust the frequency and gain characteristics in the drag & drop manner after touching each point 51 located on the curved line 50. That is, if the user drags a desired point in the vertical direction and/or the horizontal direction after touching the point on the curved line 50, the controller 180 adjusts the gain and frequency characteristics of the EQ filter by moving the point to the corresponding position, and then visually displays the characteristics on the display unit 151.

If the user increases or decreases a width of the curved line 50 using the multi-touch input method (multi-point touch), that is, the Q-factor, the sharpness of the line 50 may be adjusted and the result be visually displayed on the display unit 151. Thereafter, if the user completes the setting of the parameters, the controller 180 stores the adjusted parameter values (frequency, gain and Q-factor) in the memory 160

(S13). Further, the stored values may be used as a basic guide or be read as necessary to listen to music.

Figure 8:
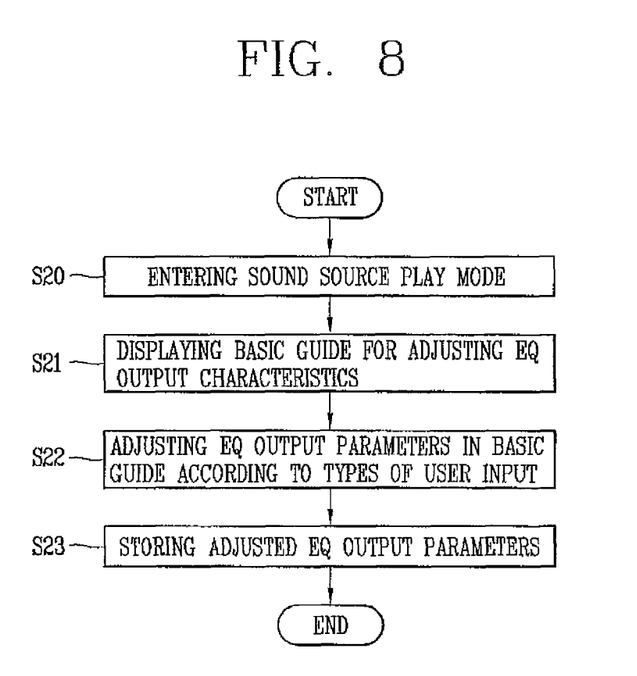
FIG. 8 is a flowchart showing a method for controlling an equalizer in a mobile terminal according to a second embodiment of the present invention.

Next, FIG. 8 is a flowchart showing a method for controlling an equalizer in a mobile terminal according to a second embodiment of the present invention. In the second embodiment shown in FIG. 8, a pre-stored basic guide is provided instead of generating a new basic guide. In addition, output parameters (frequency, gain and Q-factor) of the equalizer are adjusted in the drag & drop manner after touching the basic guide.

That is, the user selects the sound source play mode by touching a specific key in the user input unit 130 and then enters an EQ output characteristic controlling mode from the selected sound source play mode (S20). If the user selects a sound source play mode from the controlling mode, the controller 180 displays an additional basic guide, that is, the reference line 54 and at least one point 51 on the touch screen of the display unit 151 (S21). Also, the reference line 54 is a pre-stored optimized EQ characteristic and implemented as a straight line as shown in FIG. 6 or as a curved line implemented by partially adjusting the frequency, the gain and the Q-factor.

The user may then select a desired point 51 on the curved line 54 using a short touch input method on the display basic guide and then move the position of the corresponding point in the drag & drop manner so as to adjust the frequency and gain characteristics (S22). Further, if the user increases or decreases a width of the curved line 54 using the multi-touch input method (multi-point touch), the sharpness of the curved line 50, that is, Q-factor, may be adjusted and the result be visually displayed the display unit 151. Thereafter, if the user completes the setting of the parameters, the controller 180 stores the adjusted parameter values (frequency, gain and Q-factor) in the memory 160. The stored values may be used as a basic guide or be read as necessary to listen to music (S23).

In addition, the first and second embodiments of the present invention may be configured to simultaneously display the reference line and the curved line (EQ characteristics). Therefore, the user can easily compare the EQ characteristics having been changed by himself/herself with the reference line auditorily as well as visually. In addition, the first and second embodiments of the present invention can be applied to a mobile terminal and also to all electronic components having an equalizer and implemented in a touch manner.

Further, various embodiments described herein may be implemented in a computer-readable medium using, for example, software, hardware, or some combination thereof. For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some instances, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Further, the aforementioned method may be implemented in a computer-readable medium as a computer-readable code. The computer-readable medium includes all recording devices in which data which can be read by a computer system is stored. The computer-readable medium includes, for example, ROM, RAM, CD-ROM, a magnetic tape, a floppy disk, an optical data storage device and a unit implemented in a carrier wave format (e.g., transmission through Internet). Also, the computer may also include the controller 180 of the mobile terminal.

The above-mentioned methods for controlling the equalizer of the mobile terminal are not limited to the configurations and methods of the embodiments. That is, all or part of each embodiment may be selectively combined with each other so as to implement various modifications of the embodiments.

As aforementioned, according to embodiments of the present invention, the parameters of the digital parametric EQ are adjusted by a touch manner when the sound source is being output, and accordingly the user can easily and effectively adjust the output of sound source by auditorily and visually checking the changes. Therefore, the user can listen to music while adjusting the output of sound source as he/she wants, and enhance a quality of the audio of the mobile phone. Thus, the present invention provides a significant advantage because the user can minutely adjust the equalizer parameters using a touch input manner rather than using an inconvenient corresponding key or a button action.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A mobile terminal, comprising:
an output unit configured to output sound;
an equalizer configured to adjust parameters of the sound output by the output unit;
a display unit including a touch screen and configured to display a Graphic User Interface (GUI) including a line representing a graphical guide that can be touched and moved to adjust the parameters of the sound output by the output unit; and
a controller configured to control the equalizer to adjust the parameters of the sound output by the output unit in accordance with a shape of the graphical guide that is touched and moved,
wherein the display unit is further configured to display a plurality of points on the graphical guide based on corresponding positions on the graphical guide being touched, wherein each point corresponds to a respective filter of the equalizer, and wherein the positions of the plurality of points corresponding to respective filters are randomly selected by a user on the line representing the GUI.

2. The mobile terminal of claim 1, wherein the display unit is further configured to display a default basic guide or a pre-stored guide as the graphical guide.

3. The mobile terminal of claim 1, wherein the controller is further configured to generate a sound effect or to change a color of a corresponding point when the corresponding point is touched for a short predetermined period of time.

4. The mobile terminal of claim 3, wherein the display unit is further configured to display a selective menu window allowing for manual inputting of the parameters for the respective filter when the corresponding point is touched for a long predetermined period of time that is longer than the short predetermined period of time.

5. The mobile terminal of claim 4, wherein the selective menu window includes options for changing a frequency, a gain, and a Q-factor of the respective filter corresponding to the touched point and a touch or drag sound effect when the touched point is touched.

6. The mobile terminal of claim 1, wherein the controller is further configured to adjust a frequency and a gain of the respective filter of the equalizer when a displayed point on the graphical guide is touched and dragged in a vertical and horizontal direction, and to adjust a Q-factor of the respective filter of the equalizer when a thickness of the line representing the graphical guide is increased or decreased based on a simultaneous double touching and moving of the displayed point.

7. The mobile terminal of claim 1, wherein the controller is further configured to remove a displayed point on the graphical guide when the displayed point is double touched, and to return parameters of the filter to an original state when the touched and dragged point is flicked.

8. The mobile terminal of claim 1, wherein the display unit is further configured to display a current output adjustment status of the equalizer on the GUI.

9. The mobile terminal of claim 1, further comprising:
a memory configured to store the adjusted values for each respective filter,
wherein the controller is further configured to read the adjusted values for each respective filter when the output unit outputs the sound.

10. A method of controlling a mobile terminal, the method comprising:
outputting sound via an output unit in the mobile terminal;
displaying a Graphic User Interface (GUI) including a line representing a graphical guide that can be touched and moved to adjust parameters of the sound output by the output unit; and
adjusting the parameters of the sound output by the output unit in accordance with a shape of the graphical guide that is touched and moved,
wherein the displaying step further comprises displaying a plurality of points on the graphical guide based on corresponding positions on the graphical guide being touched,
wherein each point corresponds to a respective filter of an equalizer used to equalize the sound output by the output unit, and
wherein the positions of the plurality of points corresponding to respective filters are randomly selected by a user on the line representing the GUI.

11. The method of claim 10, wherein the displaying step further comprises displaying a default basic guide or a pre-stored guide as the graphical guide.

12. The method of claim 10, further comprising:
generating a sound effect or changing a color of a corresponding point when the corresponding point is touched for a short predetermined period of time.

13. The method of claim 12, wherein the displaying step further comprises displaying a selective menu window allowing for manual inputting of the parameters for the respective filter when the corresponding point is touched for a long predetermined period of time that is longer than the short predetermined period of time.

14. The method of claim 13, wherein the selective menu window includes options for changing a frequency, a gain, and a Q-factor of the respective filter corresponding to the touched point and a touch or drag sound effect when the touched point is touched.

15. The method of claim 10, wherein the adjusting step further comprises adjusting a frequency and a gain of the respective filter of the equalizer when a displayed point on the graphical guide is touched and dragged in a vertical and horizontal direction, and adjusting a Q-factor of the respective filter of the equalizer when a thickness of the line representing the graphical guide is increased or decreased based on a simultaneous double touching and moving of the displayed point.

16. The method of claim 10, further comprising:
removing a displayed point on the graphical guide when the displayed point is double touched; and
returning parameters of the filter to an original state when the touched and dragged point is flicked.

17. The method of claim 10, wherein the displaying step further comprises displaying a current output adjustment status of the equalizer on the GUI.

18. The method of claim 10, further comprising:
storing the adjusted values for each respective filter; and
reading the adjusted values for each respective filter when the output unit outputs the sound.

19. The mobile terminal of claim 1, wherein the controller is further configured to adjust a frequency and a gain of first and second filters represented by first and second points displayed on the graphical guide, when a position between the first and second points of the graphical guide is touched and dragged in a vertical and horizontal direction.

20. The method of claim 10, wherein the adjusting step adjusts a frequency and a gain of first and second filters represented by first and second points displayed on the graphical guide, when a position between the first and second points of the graphical guide is touched and dragged in a vertical and horizontal direction.

* * * * *